(12) United States Patent
Tao et al.

(10) Patent No.: US 12,601,412 B2
(45) Date of Patent: Apr. 14, 2026

(54) DURABILITY TESTING APPARATUS FOR WATER DRAINAGE FLAP, AND TESTING METHOD USING THE DURABILITY TESTING APPARATUS FOR WATER DRAINAGE FLAP

(71) Applicant: SUZHOU SUSHI TESTING GROUP CO., LTD., Suzhou (CN)

(72) Inventors: Xiaogang Tao, Suzhou (CN); Jiangfeng Zhu, Suzhou (CN)

(73) Assignee: SUZHOU SUSHI TESTING GROUP CO., LTD., Suzhou (CN)

( * ) Notice: Subject to any disclaimer, the term of this patent is extended or adjusted under 35 U.S.C. 154(b) by 447 days.

(21) Appl. No.: 18/285,060

(22) PCT Filed: Nov. 23, 2021

(86) PCT No.: PCT/CN2021/132457
§ 371 (c)(1),
(2) Date: Sep. 29, 2023

(87) PCT Pub. No.: WO2022/217921
PCT Pub. Date: Oct. 20, 2022

(65) Prior Publication Data
US 2024/0175503 A1 May 30, 2024

(30) Foreign Application Priority Data
Apr. 15, 2021 (CN) .......................... 202110403798.4

(51) Int. Cl.
*F16K 17/00* (2006.01)
*G01M 13/003* (2019.01)

(52) U.S. Cl.
CPC ........... *F16K 17/00* (2013.01); *G01M 13/003* (2019.01)

(58) Field of Classification Search
USPC .......................................................... 73/570
See application file for complete search history.

(56) References Cited

FOREIGN PATENT DOCUMENTS

| CN | 210400761 U | 4/2020 |
| CN | 210464910 U | 5/2020 |

(Continued)

OTHER PUBLICATIONS

International Search Report (PCT/ISA/210) issued in PCT/CN2021/132457, dated Jan. 26, 2022.

*Primary Examiner* — Walter L Lindsay, Jr.
*Assistant Examiner* — Warren K Fenwick
(74) *Attorney, Agent, or Firm* — Birch, Stewart, Kolasch & Birch, LLP

(57) ABSTRACT

A durability testing apparatus for a water drainage flap to test the durability of the water drainage flap. The water drainage flap comprises a flap column, a water drainage plate arranged inside the flap column and a water drainage rotation shaft connected with the water drainage plate. The durability testing apparatus for the water drainage flap comprises: a vibration table for providing vertical reciprocal vibration and a water inlet flange disc fixed on the vibration table for supplying water to the water drainage flap, wherein the water inlet flange disc comprises a base fixed to the vibration table and a water inlet column arranged on the base and facing the water drainage flap, a water inlet is provided in the water inlet column, the water inlet column and the flap column enclose a water inlet chamber, and the water inlet communicates with the water inlet chamber.

10 Claims, 4 Drawing Sheets

(56)                    References Cited

FOREIGN PATENT DOCUMENTS

| | | | | | |
|---|---|---|---|---|---|
| CN | 111537218 | A | * | 8/2020 | .......... G01M 13/003 |
| CN | 111649888 | A | * | 9/2020 | ............ G01M 13/00 |
| CN | 112943987 | A | | 6/2021 | |
| CN | 214699382 | U | | 11/2021 | |
| JP | 55-62340 | A | | 5/1980 | |
| JP | 2016-136110 | A | | 7/2016 | |
| KR | 10-2016-0094206 | A | | 8/2016 | |
| KR | 10-2018-0137319 | A | | 12/2018 | |
| KR | 10-2166660 | B1 | | 10/2020 | |
| WO | WO 2012/075588 | A1 | | 6/2012 | |

* cited by examiner

DURABILITY TESTING APPARATUS FOR WATER DRAINAGE FLAP, AND TESTING METHOD USING THE DURABILITY TESTING APPARATUS FOR WATER DRAINAGE FLAP

TECHNICAL FIELD

The present invention relates to a durability testing apparatus for a water drainage flap and a testing method using the durability testing apparatus for a water drainage flap.

BACKGROUND ART

A water drainage flap for an airplane is an execution mechanism for discharging water for an airplane hatch door. During daily use of the airplane hatch door, when an airplane encounters rain during a flight, if the hatch door is opened or the sealing strip for the hatch door ages, rain water may enter the airplane cabin through the hatch door. There must be some measures to discharge the water accumulated in the cabin. When the water in the water storage compartment of the airplane reaches a certain amount, an automatic mode of the water drainage flap of the airplane is activated. A water discharging flowrate of the hatch door is changed by changing a flow area of the water drainage flap of the airplane after an angular position instruction signal sent by a pressure control apparatus is received, thereby achieving a water discharging function of the cabin. When the automatic mode is invalid, a crew member will manually control a water discharging rotation shaft of the water drainage flap via a panel. The water discharging flowrate of the water storage compartment is changed by changing a flow area of the water drainage flap of the airplane.

Due to the specific environment encountered during the flight of the airplane, it is necessary to frequently rotate the flap blades of the airplane water drainage flap, so the durability test of the airplane water drainage flap has become an important part of airplane reliability tests. At present, conventional water drainage flap durability testing can be performed by simulating random vibration of the airplane by an electric vibration table. During the test, the vibration is transmitted to the water drainage flap of an airplane through fixtures, and a certain load is applied at the other end to simulate the water pressure of the water drainage flap. However, such a test can only roughly simulate the environment. When the flap blade turns by an angle, the force loading device cannot continuously apply force, resulting in discontinuity of the test. To sum up, the durability test device of the commonly used water drainage flap of an airplane cannot fully simulate the real environment, and it is not suitable as a method for continuously testing the durability of the water drainage flap.

In view of the above, it is necessary to improve the existing durability testing apparatus for a water drainage flap to solve the above problem.

SUMMARY OF THE INVENTION

An object of the present invention is to provide a durability testing apparatus for a water drainage flap to solve the problem that an existing testing apparatus cannot continuously provide loading force.

To realize the above object, the present invention provides a durability testing apparatus for a water drainage flap to test the durability of the water drainage flap. The water drainage flap comprises a flap column, a water drainage plate arranged inside the flap column and a water drainage rotation shaft connected with the water drainage plate. The durability testing apparatus for the water drainage flap comprises: a vibration table for providing vertical reciprocal vibration and a water inlet flange disc fixed on the vibration table for supplying water to the water drainage flap, wherein the water inlet flange disc comprises a base fixed to the vibration table and a water inlet column arranged on the base and facing the water drainage flap, a water inlet is provided in the water inlet column, the water inlet column and the flap column enclose a water inlet chamber, and the water inlet communicates with the water inlet chamber.

As an improvement of the present invention, an overflow port in communication with the water inlet chamber is arranged in the water inlet column.

As an improvement of the present invention, the water inlet flange disc comprises an overflow valve connected to the overflow port.

As an improvement of the present invention, the water drainage flap further comprises a water drainage control apparatus connected to the water drainage rotation shaft, wherein the water drainage control apparatus is configured to control the water drainage rotation shaft to drive the water drainage plate to rotate, and is fixed to the flap column and the water inlet flange disc.

As an improvement of the present invention, the water inlet flange disc further comprises fixing blocks fixed to the base and lugs fixedly connected to the fixing blocks, and the water drainage control apparatus is fixedly connected to the lugs.

As an improvement of the present invention, the durability testing apparatus for the water drainage flap further comprises a water discharging column arranged on the water drainage flap and at a side away from the water inlet flange disc, wherein the water discharging column and the flap column enclose a water discharging chamber, and the water drainage plate is arranged between the water discharging chamber and the water inlet chamber.

As an improvement of the present invention, a water outlet is arranged in the water discharging colum.

As an improvement of the present invention, the water drainage control apparatus further comprises a pressure sensor for detecting a water pressure in the water inlet chamber.

As an improvement of the present invention, the durability testing apparatus for the water drainage flap further comprises a high-pressure water tank in communication with the water inlet, wherein the high-pressure water tank comprises a pressure regulating apparatus for controlling a water pressure of water entering the water inlet chamber.

The present invention also provides a testing method using the durability testing apparatus for the water drainage flap, the testing method comprising the following steps:

S1. starting the vibration table to simulate vibration influence to a water drainage activity during operation;

S2: supplying water by the high-pressure water tank to the water inlet chamber to simulate a work environment of the water drainage flap; and regulating water pressures using the pressure regulating apparatus to simulate different work conditions;

S3 detecting a water pressure in the water inlet chamber by the pressure sensor; when the water pressure in the water inlet chamber exceeds a set value, activating the overflow valve to reduce the water pressure in the water inlet chamber; when the water pressure in the water inlet chamber does not exceed the set value, controlling the water drainage rotation shaft by using the water drainage control apparatus to drive the water drainage plate to rotate, so as to control different water drainage angles, whereby drained water enters the water discharging chamber and is discharged from the water outlet.

The advantageous effects of the present invention are as below. The durability testing apparatus for a water drainage flap of the present invention has a simple structure. The water drainage flap can be set in more real environments. The testing cost is lower, the loading force can be continuously applied, and the measurement results are more accurate.

DETAILED DESCRIPTION

Figure 1:
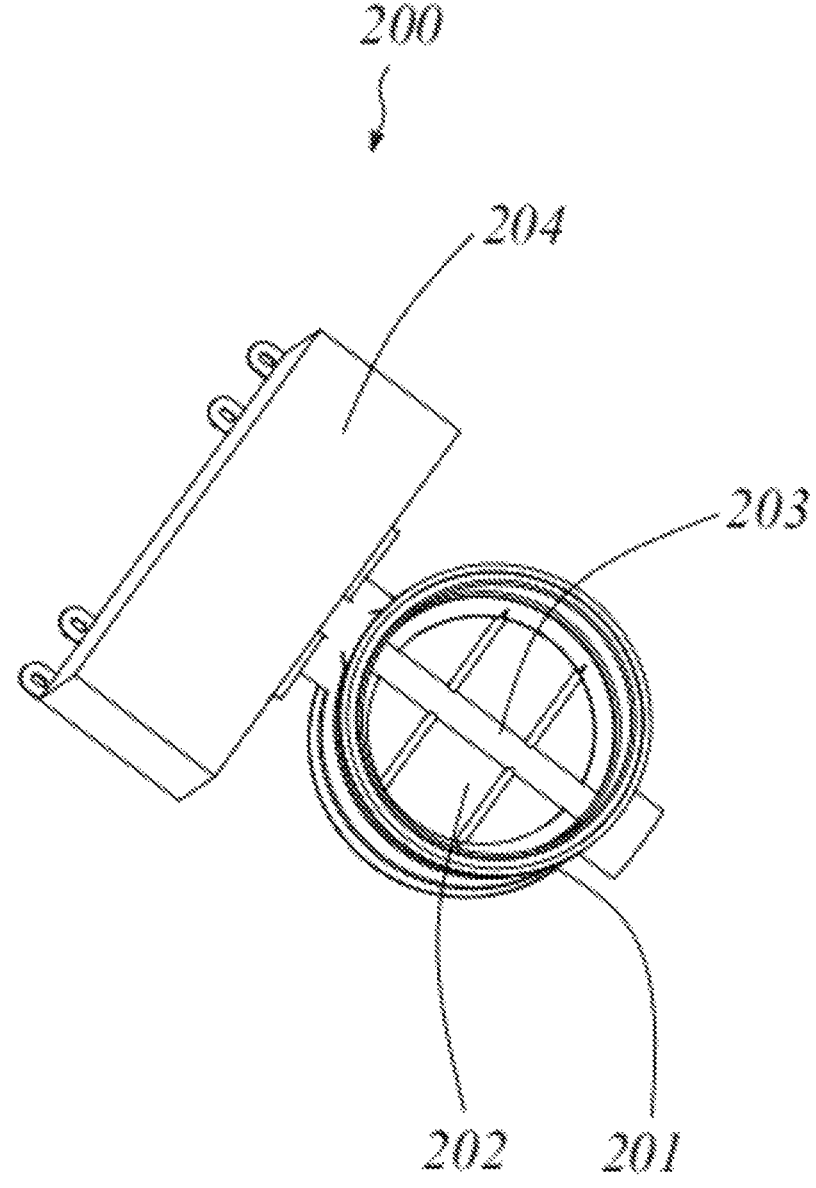
FIG. 1 is schematic structural diagram of a water drainage flap tested by a durability testing apparatus for a water drainage flap of the present invention.

The technical solutions of the present invention are described clearly and completely below in combination with the accompanying drawings. Apparently, the described embodiments are only a part of embodiments of the present invention, rather than all the embodiments. All other embodiments acquired by persons skilled in the art based on the embodiments of the present invention without creative work shall fall within the scope of the present invention.

In the description of the present invention, it should be noted that the orientation or positional relationships indicated by the terms "central", "upper", "lower", "left", "right", "vertical", "horizontal", "inner", "outer", etc., are based on the orientation or positional relationships shown in the drawings, are only for the convenience of describing the present invention and simplifying the description rather than indicating or implying that the device or element referred must have a specific orientation and must be constructed and operated in a specific orientation, and thus cannot be construed as limiting the present invention. In addition, the terms "first". "second" and "third" are only for the purpose of description and should not be understood as indicating or implying relative importance.

In the description of the present invention, it should be noted that unless otherwise clearly prescribed and defined, the terms "installed", "connected", and "coupled" should be understood in a broad sense, and may be for example, fixed connection or detachable connection, integral connection, mechanical connection, electrical connection, direct connection, or indirect connection through an intermediate medium, or internal communication of two elements. For those of ordinary skill in the art, the specific meaning of the above terms in the present invention should be understood according to the specific situations. In addition, the technical features in different embodiments of the present invention described below can be combined, so long as there is no conflict between them.

As shown in FIGS. 1-5, a durability testing apparatus 100 for a water drainage flap of the present invention is used for testing the durability of the water drainage flap 200.

As shown in FIG. 1, the water drainage flap 200 comprises a flap column 201, a water drainage plate 202 arranged inside the flap column 201, a water drainage rotation shaft 203 connected with the water drainage plate 202 and a water drainage control apparatus 204 connected with the water drainage rotation shaft 203. The water drainage control apparatus 204 is configured to control the water drainage rotation shaft 203 to drive the water drainage plate 202 to rotate, so that a rotational angle of the water drainage plate 202 can be controlled, and a water drainage amount can be controlled by controlling the flow area. In this embodiment, the rotational angle of the water drainage rotation shaft 203 is between 0 and 45 degrees. The water drainage control apparatus 204 is fixedly connected to the flap column 201.

The water drainage control apparatus 204 includes a pressure sensor and a pressure regulating apparatus.

Figure 2:
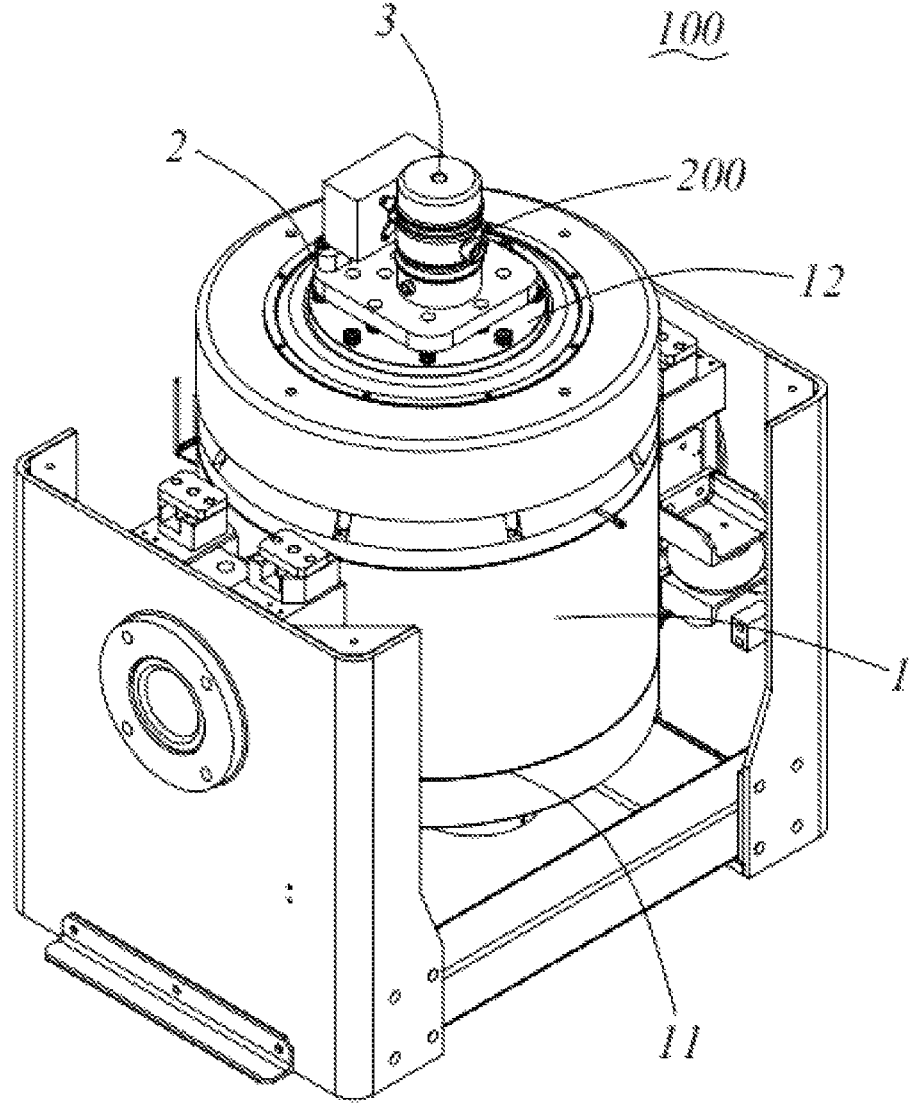
FIG. 2 is schematic perspective diagram of a durability testing apparatus for a water drainage flap of the present invention.
Figure 3:
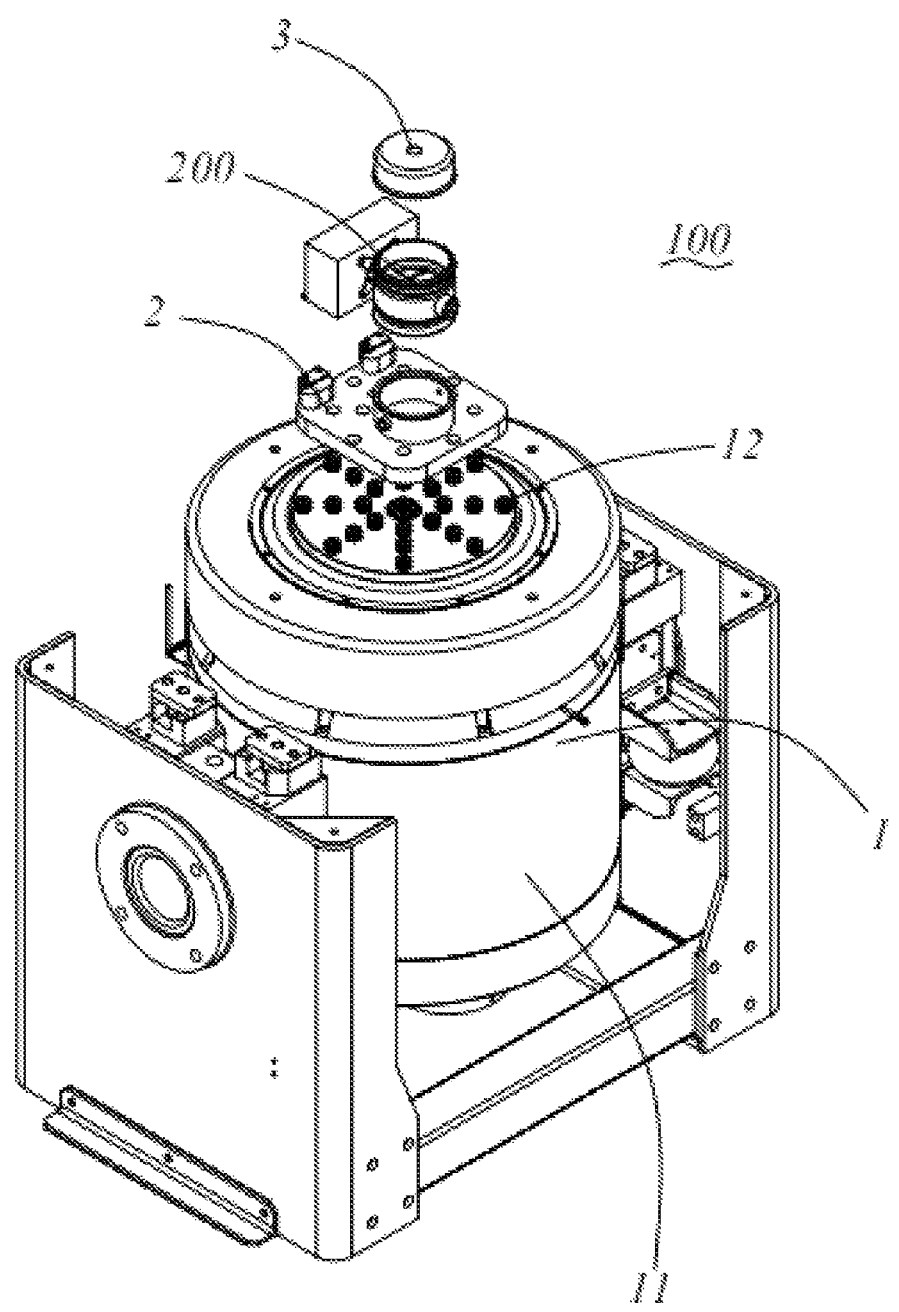
FIG. 3 is schematic exploded diagram of a durability testing apparatus for a water drainage flap of the present invention.

As shown in FIGS. 2-3, the durability testing apparatus 100 for the water drainage flap comprises, a vibration table 1 for providing vertical reciprocal vibration, a water inlet flange disc 2 fixed on the vibration table 1 for supplying water to the water drainage flap 200, a water discharging column 3 arranged on the water drainage flap 200 and at a side away from the water inlet flange disc 2, a high-pressure water tank, a return water tank and a control uni.

The vibration table 1 is an electric vibration table and includes a driving device, an external power magnifier, a controller, a table body 11 and a vibration output table surface 12. The vibration output table surface 12 is fixedly connected to the water inlet flange disc 2.

When working, the vibration table 1 can drive the vibration output table surface 12 of the vibration table 1 to move reciprocally through the driving device. The movement can be random or take a form of a sine curve wider control of the controller, so as to simulate irregular vibrations during flight of an airplane. In this embodiment, before the durability testing apparatus 100 for the water drainage flap works, the table body 11 of the vibration table 1 is installed on anchor bolts on the ground of a factory through nuts, so that the vibration table 1 can work stably. The movement provided by the vibration table 1 can simulate vibration influence to the water drainage flap 200 during flight of the airplane.

Figure 4:
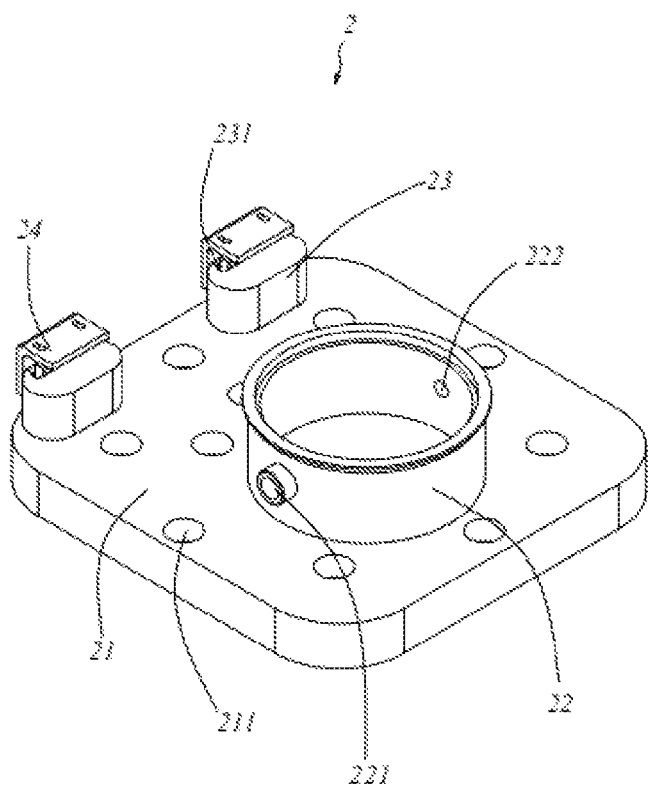
FIG. 4 is a schematic structural diagram of a water inlet flange disc of a durability testing apparatus for a water drainage flap of the present invention.

As shown in FIG. 4, the water inlet flange disc 2 includes a base 21 fixed to the vibration table 1, a water inlet column 22 arranged on the base 21 and facing the water drainage flap 200, an overflow valve, fixing blocks 23 fixed to the base 21 and lugs 24 fixedly connected to the fixing blocks 23.

Further, the base 21 is provided with sunk holes 211, so that the base can be fixedly connected to the vibration output table surface 12 of the vibration table 1 through screws.

The water inlet column 22 is provided with a water inlet 221 and an overflow port 222 which both communicate with the water inlet chamber. The overflow port 222 is arranged at a side opposite to the water inlet 221.

The water inlet 221 communicates with the high-pressure water tank. In this embodiment, the water inlet column 22 and the flap column 201 enclose the water inlet chamber, and the water inlet 221 communicates with the water inlet chamber. Water in the high-pressure water tank flows into the water inlet chamber through the water inlet 221. In this embodiment, a tapered structure is arranged at a side of the water inlet column 22 which faces the water drainage flap 200. Another tapered structure is arranged at a side of the flap column 201 of the water drainage flap 200 which faces the water inlet flange disc 2. The two tapered structures are fixed by a clamping collar to prevent loosening and water leakage.

The pressure sensor is used for detecting a water pressure in the water inlet chamber. The pressure regulating apparatus is used for controlling a water pressure of water entering the water inlet chamber.

The overflow valve is connected to the overflow port 222. When the water pressure in the water inlet chamber exceeds a set value, the overflow valve is opened to discharge the water in the water inlet chamber to reduce the water pressure in the water inlet chamber, thereby preventing damages to the structure due to excessively high water pressures. Further, the overflow valve communicates with the high-pressure water tank through a high-pressure water pipe, so that overflow water can be introduced into the high-pressure water tank for recycle and reuse.

In this embodiment, the fixing blocks 23 are welded on the base 21, and are provided with mounting grooves 231 in which the lugs 24 are mounted. In this embodiment, the lugs 24 can be designed depending on different water drainage flaps 200 to meet the design requirements for water drainage flaps 200 of various model.

In this embodiment, the water inlet flange disc 2 is fixed to a water discharging apparatus. The water drainage control apparatus 204 is fixedly connected with the lugs 24 by screws.

Figure 5:
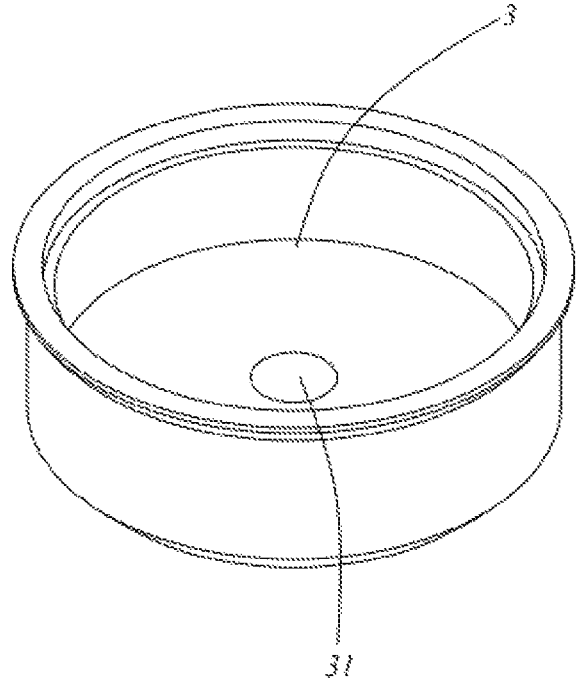
FIG. 5 is a schematic structural diagram of a water discharging column of a durability testing apparatus for a water drainage flap of the present invention.

As shown in FIG. 5, the water discharging column 3 and the flap column 301 enclose a water discharging chamber. The water drainage plate 202 is arranged between the water discharging chamber and the water inlet chamber.

The water discharging column 3 is provided with a water outlet 31 which communicates with the return water tank. The return water tank is used for collecting discharged water. The water outlet 31 is arranged at a side of the water discharging column 3 away from the water drainage flap.

In this embodiment, the return water tank may communicate with the high-pressure tank. After discharged water is accumulated to a certain amount, the collected water may reflow to the high-pressure tank for reuse.

A side of the water discharging column 3 connected with the flap column 201 is a tapered structure, which can be fixed by a clamping collar.

The control unit is electrically connected with the water drainage control apparatus 204, the pressure sensor, the pressure regulating apparatus, the overflow valve and the vibration table 1 to control operation of the durability testing apparatus 100 for the water drainage flap, including operation of the vibration table 1.

The present invention also provides a testing method using the durability testing apparatus 100 for the water drainage flap, the testing method comprising the following steps:

S1. starting the vibration table 1 to simulate vibration influence to a water drainage activity during operation, particularly vibration generated during flights of an airplane;

S2: supplying water by the high-pressure water tank to the water inlet chamber to simulate a work environment of the water drainage flap 200 (for example, water in an airplane's water storage chamber needs to be drained in a thunder and rain environment), and regulating water pressures using the pressure regulating apparatus to simulate different work conditions, such as different water pressures of stored water;

S3. detecting a water pressure in the water inlet chamber by the pressure sensor: when the water pressure in the water inlet chamber exceeds a set value, activating the overflow valve to reduce the water pressure in the water inlet chamber; when the water pressure in the water inlet chamber does not exceed the set value, controlling the water drainage rotation shaft 203 by using the water drainage control apparatus 204 to drive the water drainage plate 202 to rotate, so as to control different water drainage angles, whereby drained water enters the water discharging chamber and is discharged from the water outlet 31.

Experiments can be repeated in this way to test the durability of the water drainage flap 200.

The durability testing apparatus 100 for a water drainage flap of the present invention has a simple structure. The water drainage flap 200 can be set in more real environments. The testing cost is lower, the loading force can be continuously applied. The testing method using the durability testing apparatus 100 for the water drainage flap of the present invention is simple, and the testing results are accurate.

The technical features of the above-described embodiments may be arbitrarily combined. For the sake of brevity of description, possible combinations of the technical features in the above embodiments are not described exhaustively. However, as long as there is no contradiction in the combinations of these technical features, they should be considered to be within the scope of the present specification.

The above-described embodiments are merely illustrative of several embodiments of the present invention, and the description thereof is more specific and detailed, but such description shall not be construed as limiting the scope of the present invention. It should be noted that a number of variations and modifications may be made by those skilled in the art without departing from the concept of the present invention and they still fall within the scope of the present invention. Therefore, the scope of the present invention should be determined by the appended claims.

What is claimed is:

1. A durability testing apparatus for a water drainage flap to test the durability of the water drainage flap, the water drainage flap comprising a flap column, a water drainage plate arranged inside the flap column and a water drainage rotation shaft connected with the water drainage plate, wherein the durability testing apparatus for the water drainage flap comprises: a vibration table for providing vertical reciprocal vibration and a water inlet flange disc fixed on the vibration table for supplying water to the water drainage flap, wherein the water inlet flange disc comprises a base fixed to the vibration table and a water inlet column arranged on the base and facing the water drainage flap, a water inlet is provided in the water inlet column, the water inlet column and the flap column enclose a water inlet chamber, and the water inlet communicates with the water inlet chamber.

2. The durability testing apparatus for the water drainage flap according to claim 1, wherein an overflow port in communication with the water inlet chamber is arranged in the water inlet column.

3. The durability testing apparatus for the water drainage flap according to claim 2, wherein the water inlet flange disc comprises an overflow valve connected to the overflow port.

4. The durability testing apparatus for the water drainage flap according to claim 3, wherein the water drainage flap further comprises a water drainage control apparatus connected to the water drainage rotation shaft, wherein the water drainage control apparatus is configured to control the water drainage rotation shaft to drive the water drainage plate to rotate, and is fixed to the flap column and the water inlet flange disc.

5. The durability testing apparatus for the water drainage flap according to claim 4, wherein the water inlet flange disc further comprises fixing blocks fixed to the base and lugs fixedly connected to the fixing blocks, and the water drainage control apparatus is fixedly connected to the lugs.

6. The durability testing apparatus for the water drainage flap according to claim 5, further comprising a water discharging column arranged on the water drainage flap and at a side away from the water inlet flange disc, wherein the water discharging column and the flap column enclose a water discharging chamber, and the water drainage plate is arranged between the water discharging chamber and the water inlet chamber.

7. The durability testing apparatus for the water drainage flap according to claim 6, wherein a water outlet is arranged in the water discharging column.

8. The durability testing apparatus for the water drainage flap according to claim 7, wherein the water drainage control apparatus further comprises a pressure sensor for detecting a water pressure in the water inlet chamber.

9. The durability testing apparatus for the water drainage flap according to claim 8, further comprising a high-pressure water tank in communication with the water inlet, wherein the high-pressure water tank comprises a pressure regulating apparatus for controlling a water pressure of water entering the water inlet chamber.

10. A testing method using the durability testing apparatus for the water drainage flap according to claim 9, the testing method comprising the following steps:

S1: starting the vibration table to simulate vibration influence to a water drainage activity during operation;

S2: supplying water by the high-pressure water tank to the water inlet chamber to simulate a work environment of the water drainage flap; and regulating water pressures using the pressure regulating apparatus to simulate different work conditions;

S3. detecting a water pressure in the water inlet chamber by the pressure sensor, when the water pressure in the water inlet chamber exceeds a set value, activating the overflow valve to reduce the water pressure in the water inlet chamber: when the water pressure in the water inlet chamber does not exceed the set value, controlling the water drainage rotation shaft by using the water drainage control apparatus to drive the water drainage plate to rotate, so as to control different water drainage angles, whereby drained water enters the water discharging chamber and is discharged from the water outlet.

* * * * *